United States Patent
Yang et al.

(10) Patent No.: US 7,158,616 B2
(45) Date of Patent: *Jan. 2, 2007

(54) AUTOMATED AND INTEGRATED CALL CONTROL SERVER

(75) Inventors: Lian Yang, Woodinville, WA (US); Sheetal Guttigoli, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/051,539

(22) Filed: Feb. 3, 2005

(65) Prior Publication Data

US 2005/0152507 A1     Jul. 14, 2005

Related U.S. Application Data

(63) Continuation of application No. 09/930,570, filed on Aug. 15, 2001, now Pat. No. 6,891,929.

(51) Int. Cl.
*H04M 1/24* (2006.01)
*H04M 3/08* (2006.01)
*H04M 3/22* (2006.01)

(52) U.S. Cl. ............... 379/29.01; 379/1.01; 379/27.01; 379/29.02; 455/67.14; 455/425

(58) Field of Classification Search ............... 379/1.01, 379/9–9.02, 10.01–4, 14, 15.01, 19–22, 27.01, 379/29.01–2, 27.04; 455/67.11, 67.14–15, 455/64.17, 423, 425
See application file for complete search history.

(56) References Cited

U.S. PATENT DOCUMENTS

| | | | | |
|---|---|---|---|---|
| 5,359,464 A | * | 10/1994 | Wilkinson | 386/104 |
| 5,461,662 A | * | 10/1995 | Hanai | 379/9 |
| 5,907,610 A | * | 5/1999 | Onweller | 379/242 |
| 5,974,115 A | * | 10/1999 | Chan et al. | 379/27.01 |
| 6,002,746 A | * | 12/1999 | Mulcahy et al. | 379/22 |
| 6,148,277 A | * | 11/2000 | Asava et al. | 703/22 |
| 6,160,871 A | * | 12/2000 | DuRee et al. | 379/9 |
| 6,493,425 B1 | * | 12/2002 | Abe | 379/1.01 |

* cited by examiner

*Primary Examiner*—Binh K. Tieu
(74) *Attorney, Agent, or Firm*—Workman Nydegger

(57) ABSTRACT

Allowing a tester of a telephonic device to issue call control commands to a call control server using an intuitive set of commands and using both data lines for data call control commands, and voice lines for touch tone or "DTMF" call control commands. The user may initiate a call control command by either entering the call control command in a command line of a program executed at a telephonic device, or by crafting a function call using an Application Program Interface (API) that allows for more intuitive function calls that are more descriptive of the call control command. During execution, the more descriptive user-entered command or function call is converted into a form that recognized by the call control server. The converted call control command is then transmitted to the call control server.

7 Claims, 10 Drawing Sheets

AUTOMATED AND INTEGRATED CALL CONTROL SERVER

CROSS-REFERENCE TO RELATED APPLICATIONS

The present application is a continuation application of commonly-assigned U.S. patent application Ser. No. 09/930,570 filed Aug. 15, 2001 now U.S. Pat. No. 6,891,929, entitled "Automated and Integrated Call Control Server", and which is incorporated herein by reference.

BACKGROUND OF THE INVENTION

1. The Field of the Invention

The present invention relates to the field of telephone network and device testing. Specifically, the present invention relates to using a call control server to test a telephone network or device in an automated and integrated fashion.

2. Background and Relevant Art

The telephone has been one of the most pervasive inventions of the modern era. It is now common practice for an individual to use a telephone to audibly converse in real-time with another individual even if the caller and the callee are remotely located. Recently, the types of devices able to support telephonic communication have expanded well beyond what was conventionally thought of as a telephone. For example, digital telephones (hardwired and wireless), and some types of personal computers and Personal Digital Assistants are now able to engage in telephonic communication.

Conventionally, telephonic device manufacturers typically test their telephonic devices prior to distribution to be sure the telephonic device works as intended. In order to ensure the telephonic device works during normal use, it is desirable to test the telephonic device under a wide variety of possible conditions that the telephonic device is anticipated to experience during normal operation. However, normal operation of a telephonic device involves connection and communication with other telephonic devices. Thus, the telephonic device cannot be tested in isolation.

One way to test the operation of a telephonic device and associated telephonic network is to actually have the subject telephonic device communicate in various scenarios with other surrounding telephonic devices, and evaluate the performance of the subject telephonic device and network under the testing scenarios. While the variety of such scenarios are innumerable, such scenarios include, for example, receiving a ring generated by another telephonic device calling in, answering the telephone call and communicating between the devices, engaging in a conference call, or similar common telephonic activities.

According to one conventional method, an individual stations the other surrounding telephonic devices in order to provide the necessary input to those other telephonic devices in order to test the subject telephonic device. However, this requires that a human user take the effort to enter in the correct sequences of input at the correct times in order to provide the desired testing conditions for the subject telephonic device.

In order to remove the cost and unpredictability associated with using humans to station the surrounding telephonic devices, server technology has developed that allows a server to emulate the associated telephone network and surrounding telephonic devices. Servers that have this capability are often called "call control" servers.

Conventional call control servers allow a tester to dial into the call control server and instruct the call control server to perform certain telephone related actions. The instructions may be dispatched by first establishing a telephonic connection with one of the lines of the call control server. Then, the tester may dispatch the instructions by dialing the keypad of a conventional telephone with a particular audible tone sequence. Specifically, when the user enters a digit such as 0, 1, 2, 3, 4, 5, 6, 7, 8, 9, * or # on the keypad, a distinct audible tone is asserted on the telephone connection. The call control server converts the frequency of each successive tone into its corresponding digit 0 through 9, * or #. Specifically, the tones are generated and interpreted using a known standard such as the Dual Tone Multi-Frequency. Then, the call control server may interpret the digits and implement the associated instruction. Thus, a tester may control a conventional call control servers via standard telephone voice lines.

While conventional call control servers are useful in eliminating the need for a person to station surrounding telephones during testing, the number of commands that may be implemented is fairly limited. This is due, in part, to the limited way in which a tester issues commands; namely, through DTMF tones. The dial tone command set associated with a particular call control server is typically not intuitive since the command set is limited to the digits 0 through 9, * and #. Since the command set is not intuitive, it is difficult for a human tester to remember a large number of commands. Accordingly, the amount of scenarios enabled by conventional call control servers is also relatively limited.

Methods also exist for issuing non-audible data commands to call control servers over a data line. However, these conventional methods are limited in the level of integration between the issuing of data commands over data lines, and the actual implementation of such commands on voice lines. For example, under conventional technology, one cannot issue a data command over a data line to command a call control server to establish a multi-line conference call over voice lines.

Therefore, what is desired are mechanisms for telephonic testing in which the call control server has more integrated data and voice features, and in which the tester may use a more intuitive command set thereby allowing for more testing scenarios.

BRIEF SUMMARY OF THE INVENTION

Methods, systems and computer program products are described for allowing a tester to issue call control commands to a call control server using an intuitive set of commands and using both data lines for data call control commands, and voice lines for touch tone or "DTMF" commands.

The user may initiate a call control command by either entering the call control command in a command line of a program executed at a telephonic device, or by crafting a function call using an Application Program Interface (API) that allows for more intuitive function calls that are more descriptive of the call control command. During execution, the more descriptive user-entered command or the function call is converted into a form that is recognized by the call control server. The converted call control command is then transmitted to the call control server.

Many call control servers are configured to respond to commands in which the characters of the command are limited to the digits 0 through 9, "*", and "#" corresponding to the keypad of a conventional telephone. However, such commands are typically not descriptive of the actual call control command. For example, the sequence "001 *" could mean "hang up immediately." However, a casual observer a would not be able to tell what the sequence means without memorizing the meaning. One the other hand, a function call or command CCSMakeConf ccsLine1 ccsLine2 is more intuitive and descriptive. This command instructs the call control server or CCS to make a conference call (MakeConf) using two identified lines (e.g., ccsLine1 and ccsLine2). Since the principles of the present invention allow for more descriptive and user-friendly call control commands, the set of call control commands is less confusing, and thus the user may master more call control command thereby making more effective use of the call control server.

In addition to the flexibility in how the user may issue call control commands, the call control server also allows testers to issue commands over both data and voice lines. Thus, a tester may issue a command over a data line to engage two voice lines in a teleconference.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
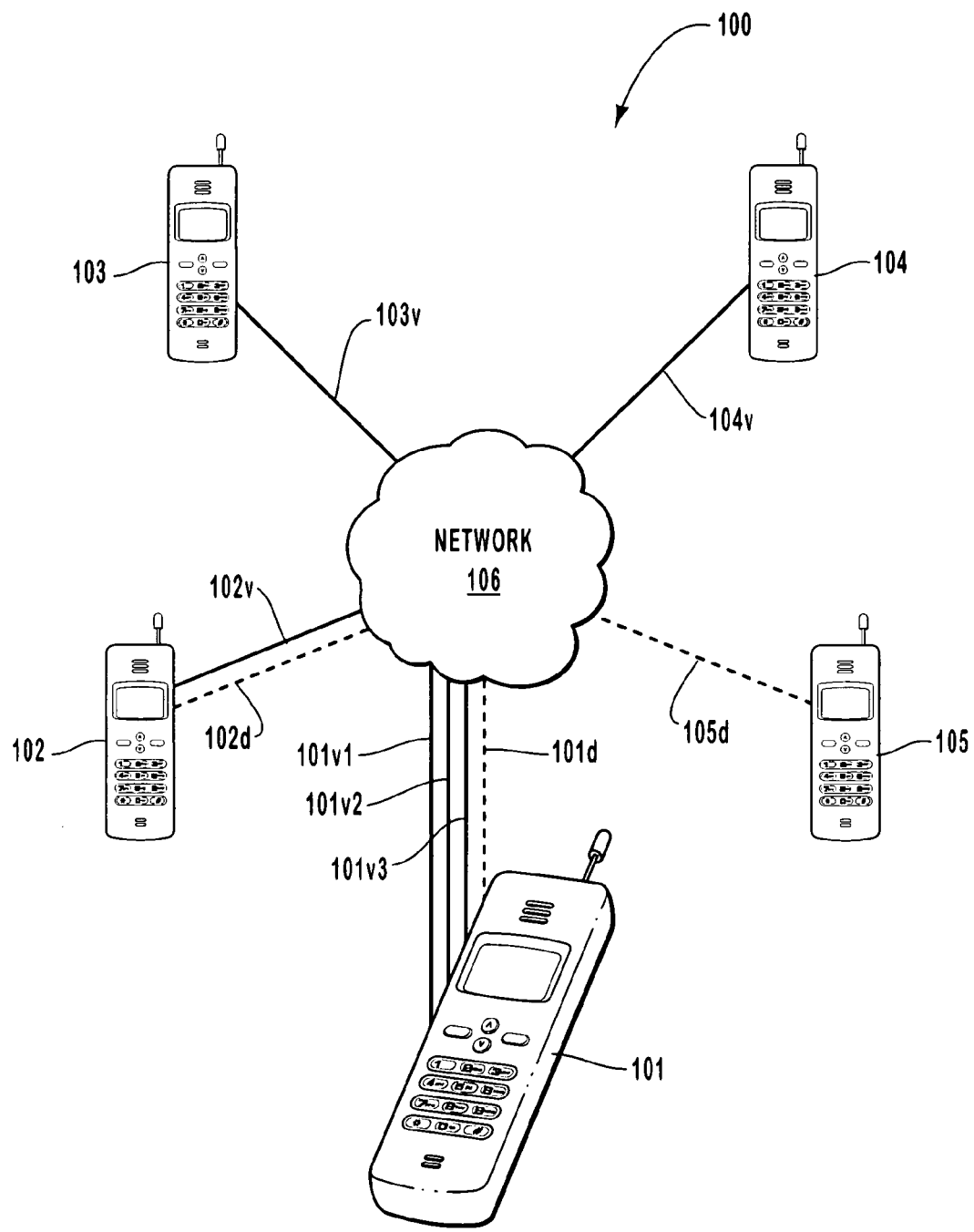
FIG. 1 illustrates an example testing environment that is emulated by a call control server.

The present invention extends to methods, systems, and computer program products for allowing a tester to issue call control commands to a call control server in order to test a network of telephonic devices. The tester has flexible and wide ranging control over the scenarios that may be tested. Specifically, the tester may issue commands and have actions taken on various voice lines using a more flexible and robust data connection, rather than having to rely exclusively on entering commands via a voice line using tone signals. Also, the tester has available a more intuitive set of commands that may be entered in a command line, or may be passed through an Application Program Interface (API), for translation into commands that are recognized by the call control server.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates an example telephonic environment 100 having a telephonic device 101 that one might desire to test for performance. The telephonic environment 100 includes a number of telephonic devices 101, 102, 103, 104 and 105 communicating over a network 106. Although the telephonic devices are illustrates as being conventional telephones, the telephonic devices may include any devices (wired or wireless) that are capable of communicating via a telephone connection. The telephonic device 101 is shown slightly larger to identify it as the test subject. The remaining telephonic devices 102, 103, 104 and 105 might be other telephonic devices that the subject telephonic device 101 might communicate with in normal operation.

Typically, there are two kinds of connections possible between telephonic devices, voice and data. Traditionally, telephonic devices were used just for communicating voice information. Such telephonic devices used a voice line to establish a voice connection over circuit-committed protocols of the Public Switched Telephone Network (PSTN). Many more recent telephonic devices may use a data line to establish a data connection for communicating data over a network. For example, Internet Protocol (IP) based networks are suitable for conveying data at a fairly low error rate.

Referring back to the example telephonic environment 100 of FIG. 1, voice lines are representing using solid lines connected to the network 106, and data lines are represented using dashed lines connected to the network 106. The subject telephonic device 101 has three voice lines 101$v$1, 101$v$2 and 101$v$3 and one data line 101$d$. The telephonic device 102 also has both a voice line 102$v$ and a data line 102$d$. Telephonic devices 103 and 104 have only a voice line 103$v$ and 104$v$, respectively. Telephonic device 105 has only a data line 105$d$. Although the network 105 is illustrated generically, it will be apparent that PSTN networks may be used to establish voice connections. In addition, PSTN networks or Public Land Mobile Networks (PLMN) may be used to establish data connections.

During normal operation, the telephonic device 101 may engage in a two-way voice call with any one of telephonic devices 102, 103 or 104. In addition, the telephonic device 101 may engage in a conference call with two or all of telephonic devices 102, 103 or 104. Furthermore, the telephonic device 101 may upload a file to, or download a file from, one or more of the telephonic devices. A tester will often try to simulate normal operations that the telephonic device is expected to encounter. Since having an individual station each of the telephonic devices for testing can be expensive, call control servers are often used to test the performance of a subject telephonic device.

Figure 2:
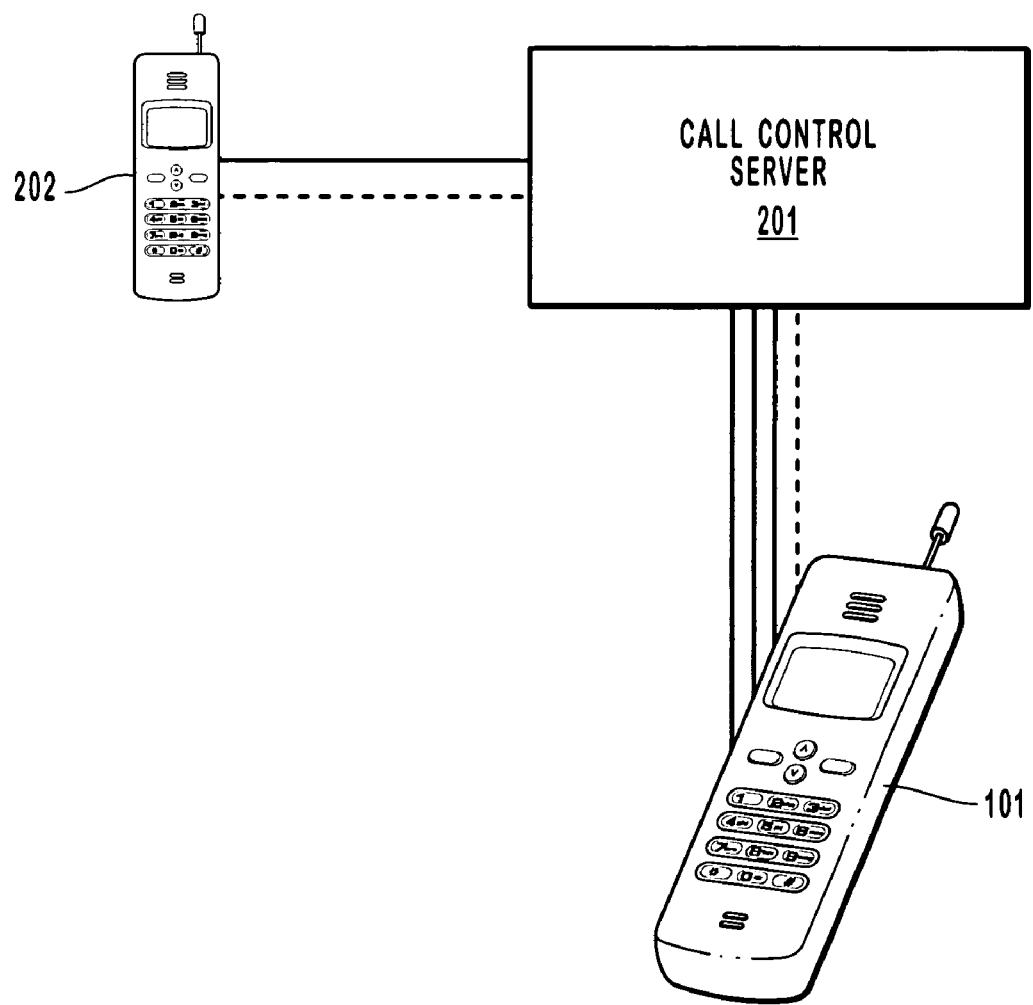
FIG. 2 schematically illustrates a subject telephonic device in communication with a call control server so as to emulate the environment illustrated in FIG. 1.

FIG. 2 schematically illustrates a subject telephonic device in communication with a call control server so as to emulate the environment illustrated in FIG. 1. Here, instead of communicating with telephonic devices 102, 103, 104 and 105, the various telephonic functions of the subject telephonic device 101 are tested by communicating instead with the call control server 201.

For example, in order to test the capability of the subject telephonic device 101 to receive a telephone call, the call control server 201 may place a telephone call to the subject telephonic device. In order to test the capability for placing a telephone call, the subject telephonic device 101 may call the call control server 201. In order to test the integrity of a voice connection, the call control server may render audio information on the voice connection. Alternatively or in addition, the subject telephonic device 101 may render audio information on the voice connection. In order to test the integrity of a data connection, the subject telephonic device 101 and the call control server 201 may exchange data files. Also in order to test the ability to engage in a conference call, the call control server may connect the first voice line established between the subject telephonic device 101 and the call control server 201 with a second voice line. The call control server may then render audio information on the second voice line. The rendered audio information may then be measured on the subject telephonic device to determine the integrity of the conference call defined by the first and second voice connections. Although the instructions to the call control server 201 may be issued by the telephonic device 101 that is subject to testing, the instructions may also originate from another telephonic device such as telephonic device 202. Note that the telephonic devices 101 and 202 may communicated with the call control server 201 using voice lines represented by solid lines, and data lines represented by dashed lines.

Figure 3:
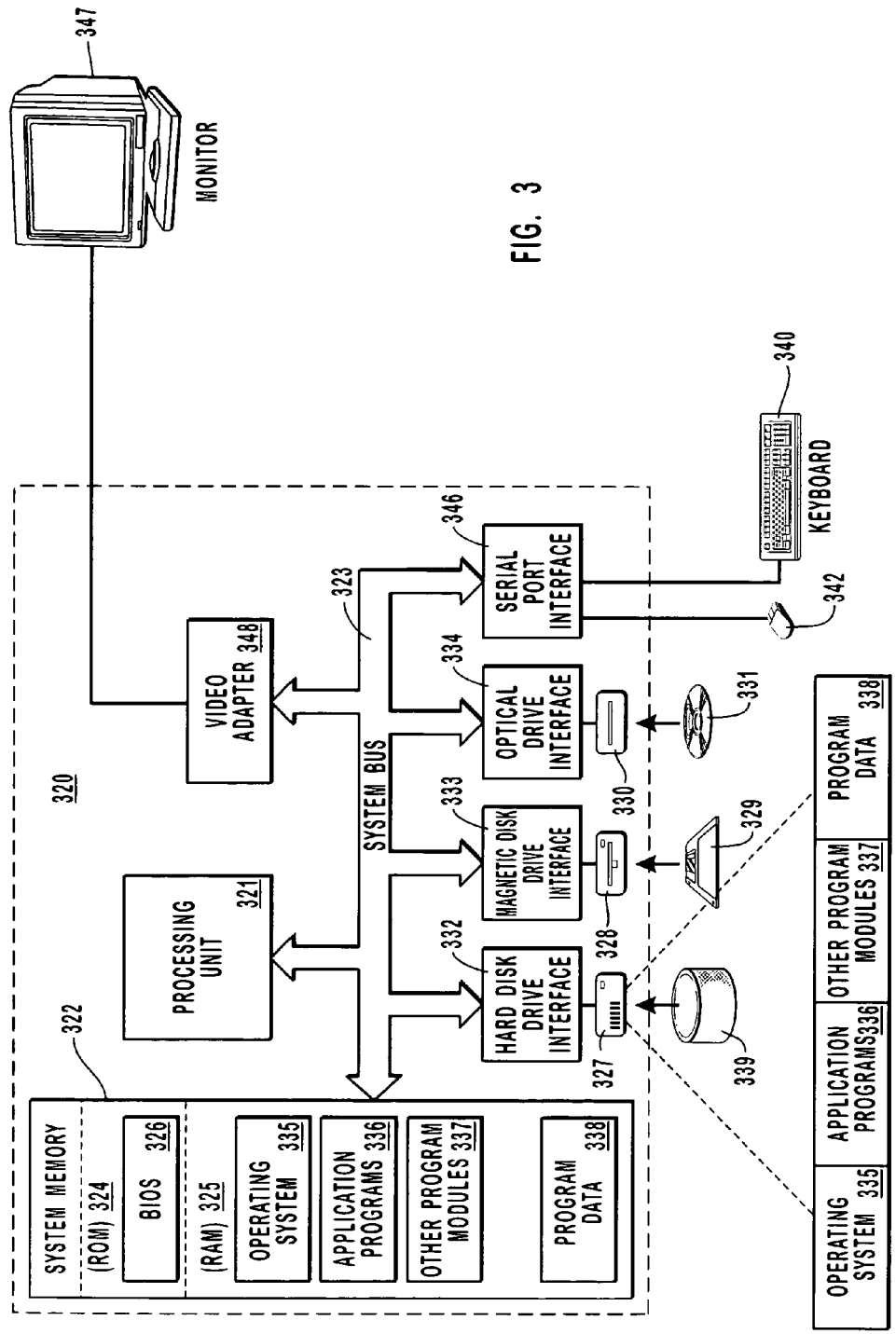
FIG. 3 illustrates a suitable structure of a call control server in which the principles of the present invention may operate.

With reference to FIG. 3, an example system for implementing the call control server 201 includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

Figure 4:
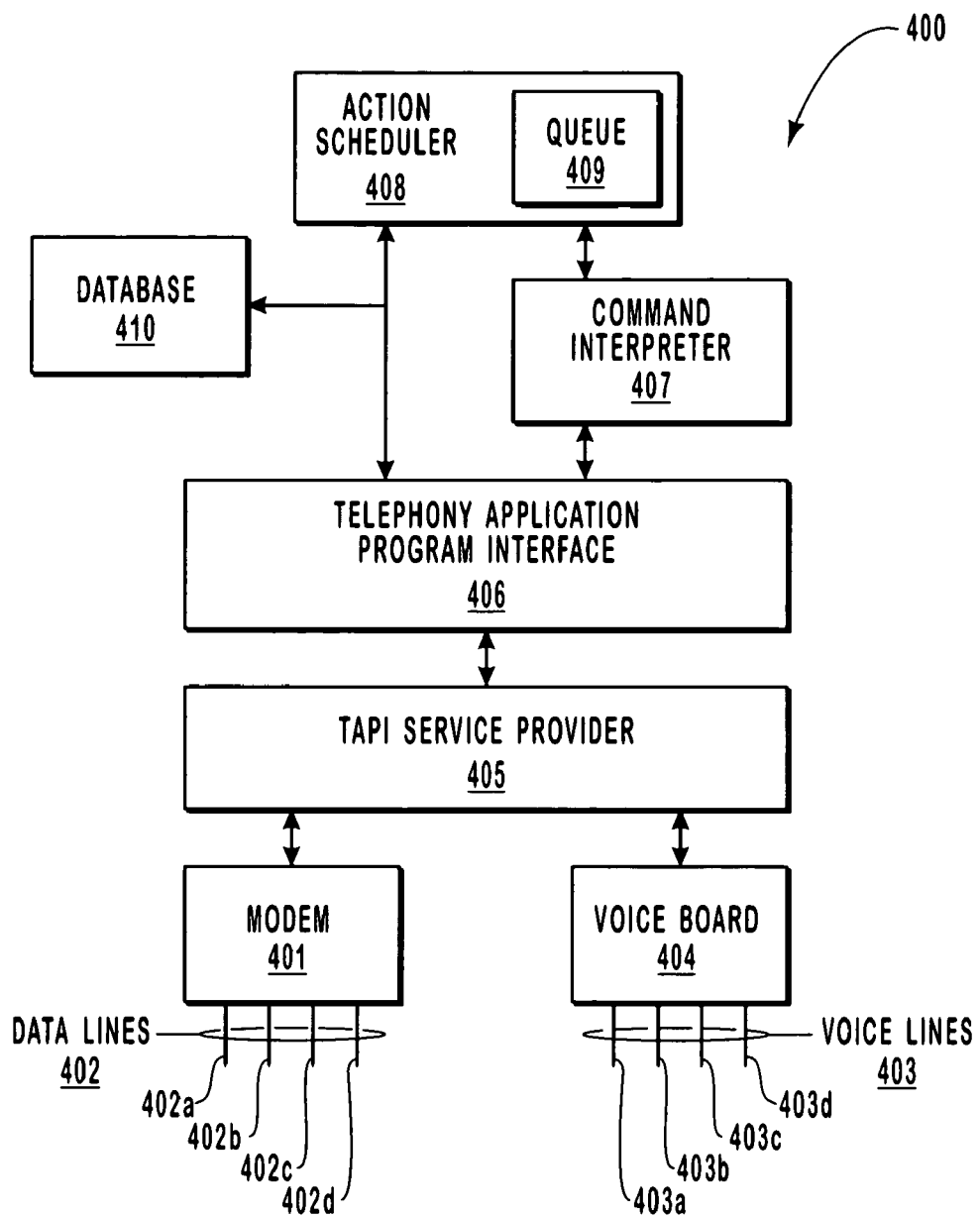
FIG. 4 schematically illustrates a software architecture that may be implemented at the call control server in accordance with the present invention.

The environment illustrated in FIG. 3 may be used to implement a call control server that responds to various call control commands, whether those commands be issued in the form of voice or touch tone DTMF commands over a voice line, or whether those commands be issued in the form of other data over a data line. FIG. 4 illustrates a more detailed architecture 400 that may be implemented by the environment described with reference to FIG. 3.

The architecture 400 includes a modem 401 that is capable of connecting to one or more data lines 402 via, for example, a COM port. In the illustrated example, the modem 401 is capable of connecting to four data lines 402a, 402b, 402c and 402d. The design of the modem 401 is not critical to the present invention. The modem 401 may be, for example, any modem capable of establishing a connection with one or more data lines, receiving data over the connection, and then passing the received data to other components for further processing. The modem 401 may also be capable of transmitting data over the one or more data lines.

The call control server 201 is also capable of receiving voice or DTMF commands over one or more voice lines 403 including, for example, voice lines 403a, 403b, 403c and 403d. A voice board 404 is capable of receiving the voice or DTMF commands and passing such commands up to other components for further processing. The voice board 404 may also be capable of rendering digital audio files (e.g., "WAV" files) on the one of more voice lines 403. Any modem capable of connecting to a data line may be used in the environment illustrated.

Any call control commands received via the data lines 402 are then passed from the modem 401 to a Telephony Application Program Interface (TAPI) Service Provider 405. Also, any call control command received via the voice lines 403 are passed from the voice board 402 to the TAPI service provider 405. The TAPI service provider 405 may be, for example, a pluggable software module authored and provided by a commercial telephone carrier. Such pluggable software modules are conventionally available.

The TAPI Service Provider 405 then passes the commands to a Telephony Application Program Interface (TAPI) module 406. As well known to those of ordinary skill in the art, a TAPI module 406 provides a set of interfaces to telephone application developers. Telephony software application may make function calls to the TAPI module 406 by specifying the function call with a predefined structure defined by TAPI. The services provided by the TAPI module 406 are published along with the prescribed structure of the corresponding function calls. For example, the TAPI interfaces may be used to detect that a call is received on a given line, instruct to answer the call, hang up, a detect that the other party has hung up, detect that a DTMF tone is being received, instruct to provide the corresponding DTMF sequence when a terminating character (e.g., star "*") is detected, connect two lines in a conference call, and the like. The TAPI module 406 serializes any received information such that application programs do not need to deal with receiving multiple streams of information in parallel.

The telephony application components that make such TAPI function calls include a command interpreter 407 and an action scheduler 408. In the event that a DTMF call control command was received over one of the voice lines 403, the TAPI module 406 will provide the DTMF sequence to the command interpreter 407. The command interpreter 407 may have previously given the TAPI module 406 an instruction to pass it any received DTMF sequence once the tone corresponding to the star symbol "*" is detected. The DTMF sequence received by the command interpreter 407 is not the original DTMF tones received by the voice board 404, but rather is the corresponding DTMF sequence represented by the letters 0 through 9, the star symbol "*" or the number symbol "#". The user of the telephonic device 101 may have generated this DTMF sequence by dialing the sequence on a keypad.

The command interpreter 407 may also receive call control commands in data form from one or more data lines 402. The TAPI module 406 passes these data commands to the command interpreter 407. Thus, the command interpreter 407 may receive call control commands that were received over voice lines 403, as well as data lines 402. This provides the call control server with a high level of flexibility in what call control functions may be invoked, and how they are invoked.

The command interpreter 407 breaks down the call control command into specific actions necessary to fulfill the call control command. These actions are then passed to the action scheduler 408, which schedules the actions according to the priority of the action. For example, a time sensitive action such as calling someone in a one second window of availability would require an immediate response. The higher priority actions will be placed in a queue 409 for immediate implementation, while the lower priority actions may be placed in a database 410. If the queue 409 or the action scheduler 408 is idle, the action scheduler 408 may scan the database 410 for actions to perform.

Figure 5:
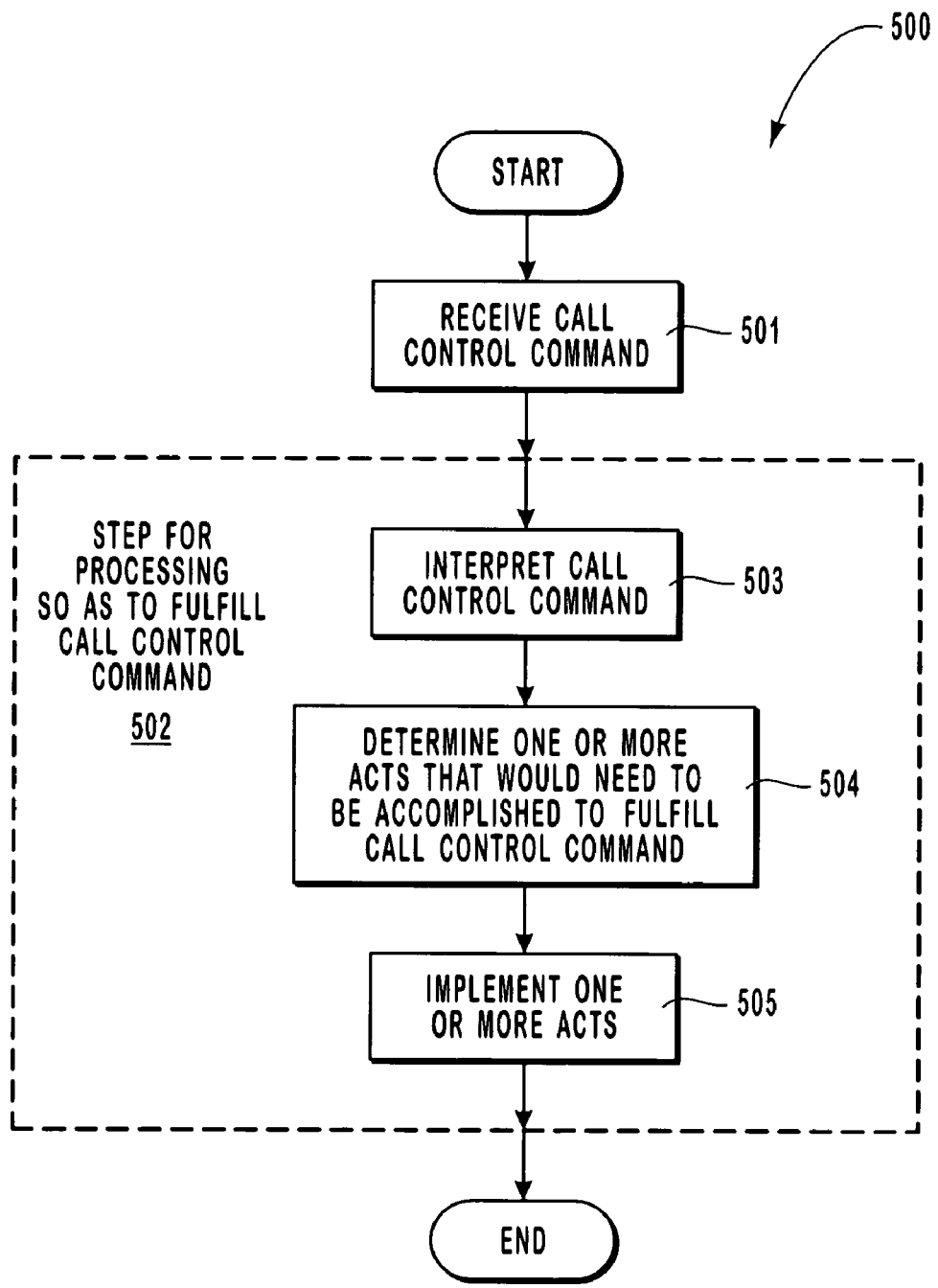
FIG. 5 illustrates a flowchart of a method implemented by the call control server in accordance with the present invention.

FIG. 5 illustrates a flowchart of a method 500 for allowing call control in a flexible manner using data commands. The call control server first receives a call control command (act 501). For example, the call control server may receive a DTMF command over the voice lines 403, or perhaps receive a data call control command over the data lines 402. In response to the call control command, the call control server performs a step for processing so as to fulfill the call control command one on or more voice lines (step 502). In one embodiment, this includes specific corresponding acts 503, 504 and 505.

In particular, the call control server interprets the call control command (act 503). This may be accomplished by, for example, the command interpreter 407 interpreting the call control commands as they are received from the TAPI module 406. The call control server then determines one or more acts that would need to be accomplished to comply with the call control command (act 504). This may also be accomplished by the command interpreter 407. The call control server then implements the one or more acts on one or more voice lines (act 505). This may be accomplished by, for example, the command interpreter 407 providing an identification of the acts to the action scheduler 408. Then, the action scheduler, schedules the actions, and then implements the actions at the appropriate time by providing one or more function calls to the TAPI module 406.

Figure 6:
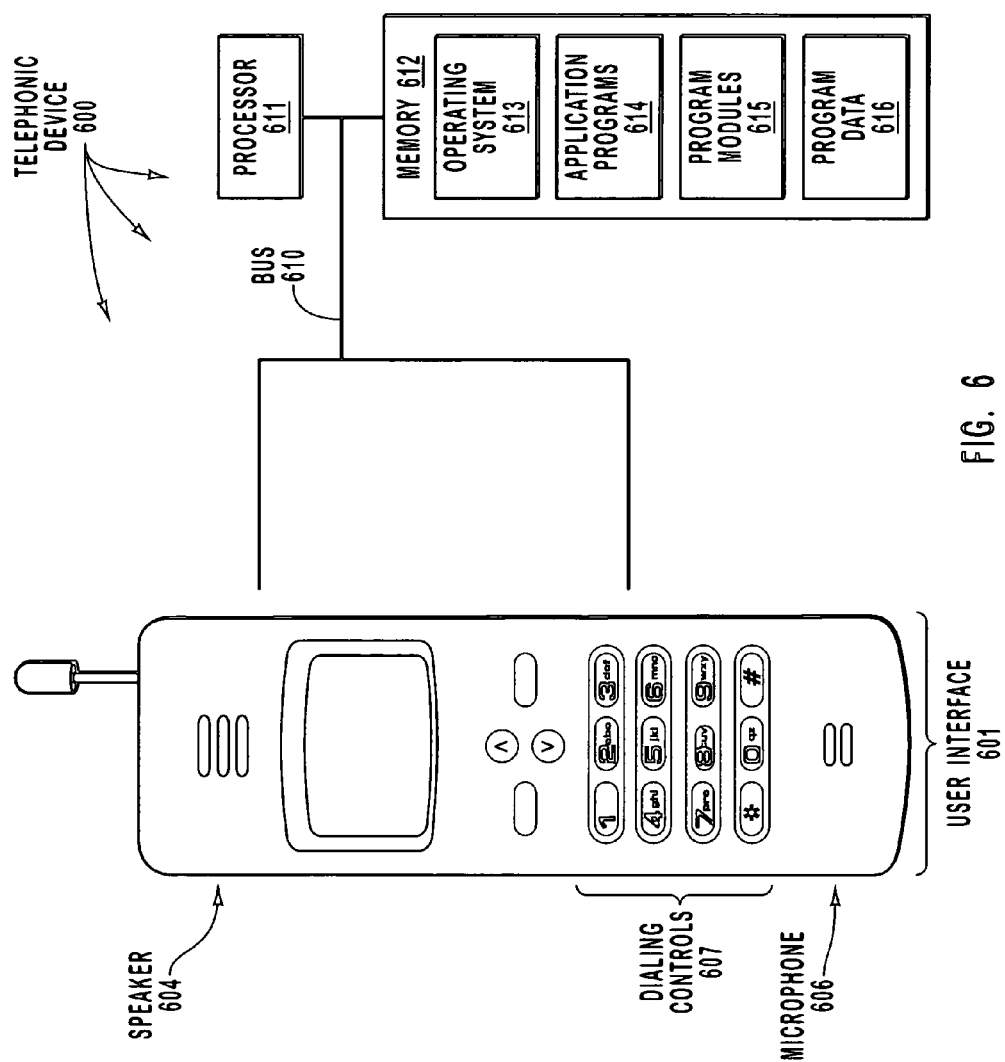
FIG. 6 illustrates a suitable hardware structure and software architecture of a telephonic device in which the principles of the present invention may operate.

FIG. 6 illustrates a suitable hardware structure and software architecture of a telephonic device 600 in which the principles of the present invention may operate. The telephonic device remotely operates the call control server 201 of FIG. 2 and may be, for example, the telephonic device 101 that is subject to testing, or perhaps another telephonic device (e.g., telephonic device 202) that may be connected to the call control server.

The telephonic device 600 includes a user interface 601 for allowing a user to make a connection to a network. The user interface 601 includes a microphone 606 for rendering audio information into electronic form. In addition, dialing controls 607 include 12 buttons through which a user may enter information. For example, a user may dial a telephone number or enter touch-tone instructions for the call control server 201 via the dialing controls 607.

Although the user interface 601 has the appearance of a mobile telephone, the unseen features of the user interface 601 may allow for complex and flexible general-purpose processing capabilities. For example, the telephonic device 600 also includes a processor 611 and a memory 612 that are connected to each other and to the user interface 601 via a bus 610. The memory 612 generically represents a wide variety of volatile and/or non-volatile memories that may be employed. The particular type of memory used in the telephonic device 600 is not important to the present invention.

Program code means comprising one or more program modules may be stored in memory 612. The one of more program modules may include an operating a system 613, one or more application programs 614, other program modules 615, and program data 616.

Figure 7:
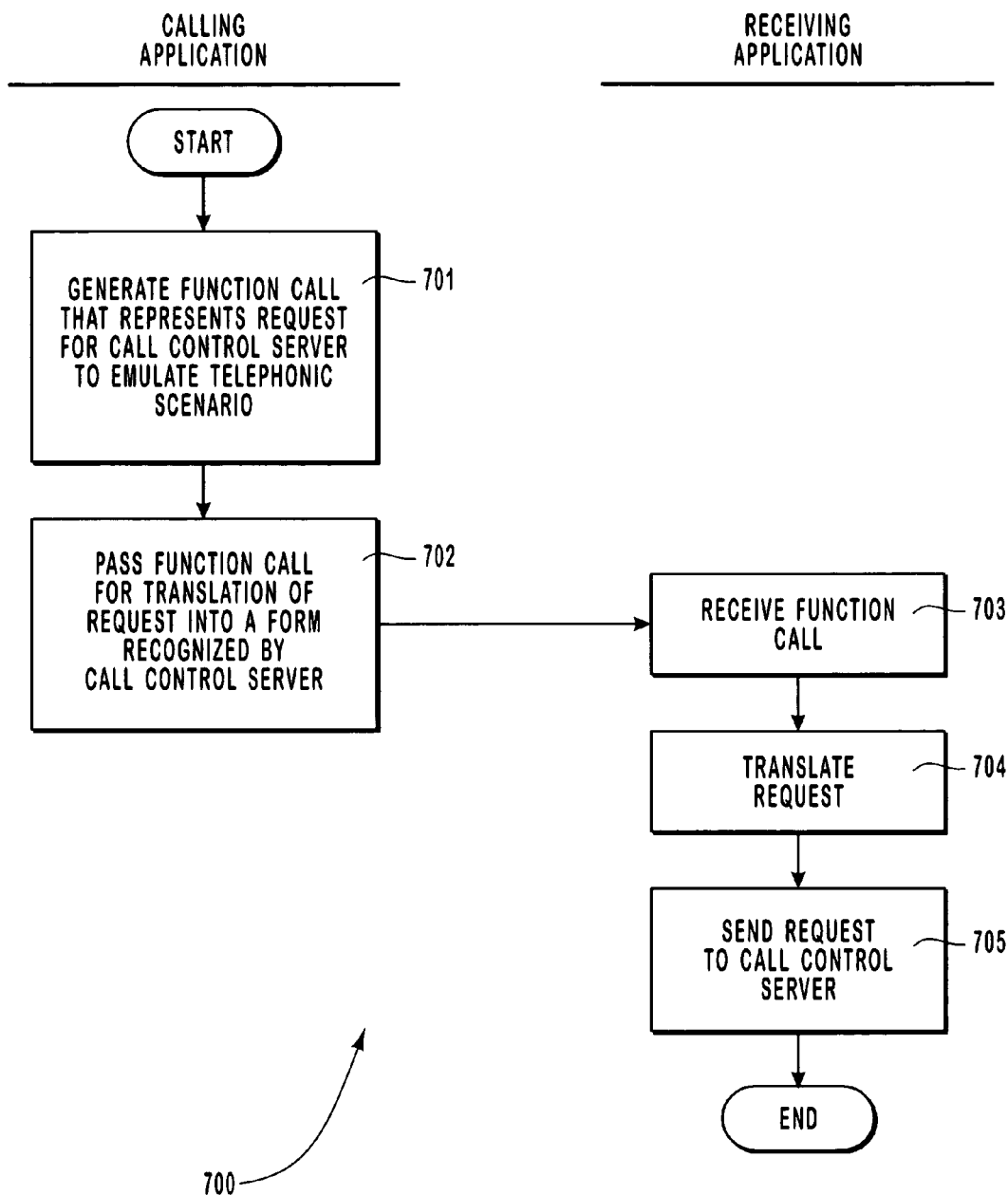
FIG. 7 illustrates a flowchart of method of using an Application Program Interface (API) in accordance with the present invention for providing a more intuitive command set to the tester of the telephonic device.

FIG. 7 illustrates a flowchart of method 700 of using an Application Program Interface (API) in accordance with the present invention for providing a more intuitive command set to the tester of the telephonic device. An application program interface (API) is the specific method prescribed by a computer operating system or by an application program by which a programmer writing an application program can make requests of the operating system or another application. For example, referring to FIG. 8, an application program 801 may include one or more function calls 802 which, when executed, are recognized as requests for service by another program such as operating system 803. The application program interface 804 provides a set of prescribed methods and structures for making the function call in such a manner that the other program may interpret the function call.

Figure 8:
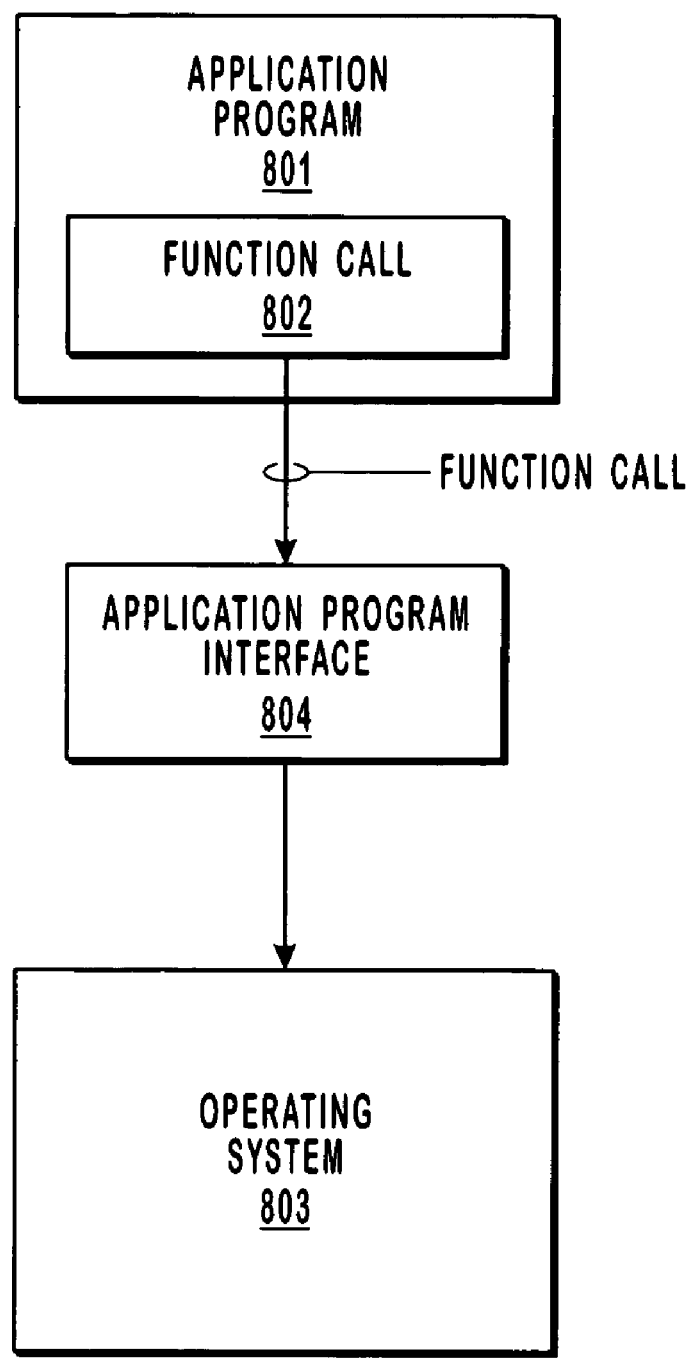
FIG. 8 illustrates a software architecture in which the application program interface may operate.

Referring to FIG. 7, some of the acts performed in the method 700 are performed by the calling application (e.g., the application program 801 of FIG. 8). These acts are listed in the left column of FIG. 7 under the heading Calling Application. Other acts are performed by the application or operating system that receives the function call (e.g., the operating system 803 of FIG. 7). These acts are listed in the right column of FIG. 7 under the heading Receiving Application.

First, the calling application performs a specific act of generating a function call that represents a request for the call control server to emulate a telephonic scenario (act 701). The request may be in a form that is not-recognized by the call control server. Specific examples of source code that may generate a function call are described below with respect to FIG. 9.

Next, the calling application passes the function call to a set of one or more program modules for translation of the request into a form that is recognized by the call control server (act 702). In the example of FIG. 8, the function call 802 is passed to the operating system 804. However, if the receiving application is executed in a different machine than the calling application, the calling application may pass the function call in the form of a Remote Procedure Call (RPC).

The receiving application then receives the function call (act 703). In response, the receiving application translates the request into a form that is recognized by the call control server (act 704) and then sends the translated request to the call control server (act 705). Thus, the developer of the calling application may generate function calls that represent call control commands in a manner that is more intuitive to the programmer. Although these call control server may not recognized the more intuitive call control commands, the receiving application translates the call control command into a form that, although it may have a less intuitive form, is at least recognized by the call control server.

Since the programmer has available a more intuitive set of function calls from which to choose, the programmer is able to more easily work with larger permutations of call control commands as compared to having to work with less intuitive call control commands that are directly recognized by the call control server.

For example, in order to make a call control command function call, the calling application present in the telephonic device 600 may use a TAPI module to issue a command to the call control server 201. Upon connection with the call control server 201, the TAPI module may then return a handle that the calling application may use when making function calls. The use of a handle in one aspect of the invention will be described below with respect to the various Application Program Interface (API) a function calls illustrated in FIG. 9.

Figure 9:
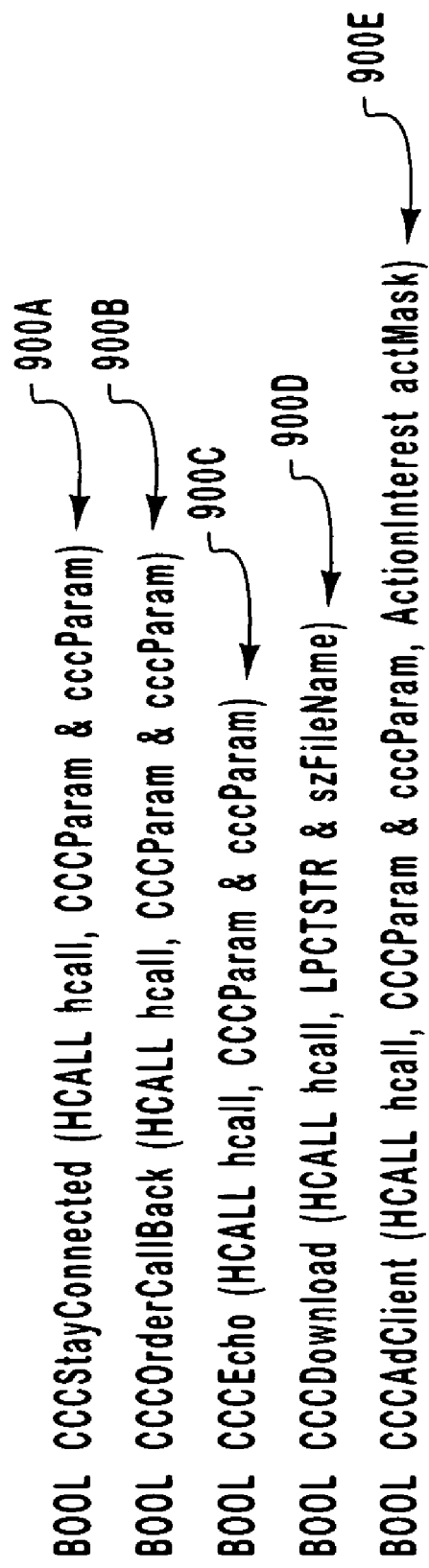
FIG. 9 illustrates a series of APIs that may be used to implement the principles of the present invention.
Figure 10:
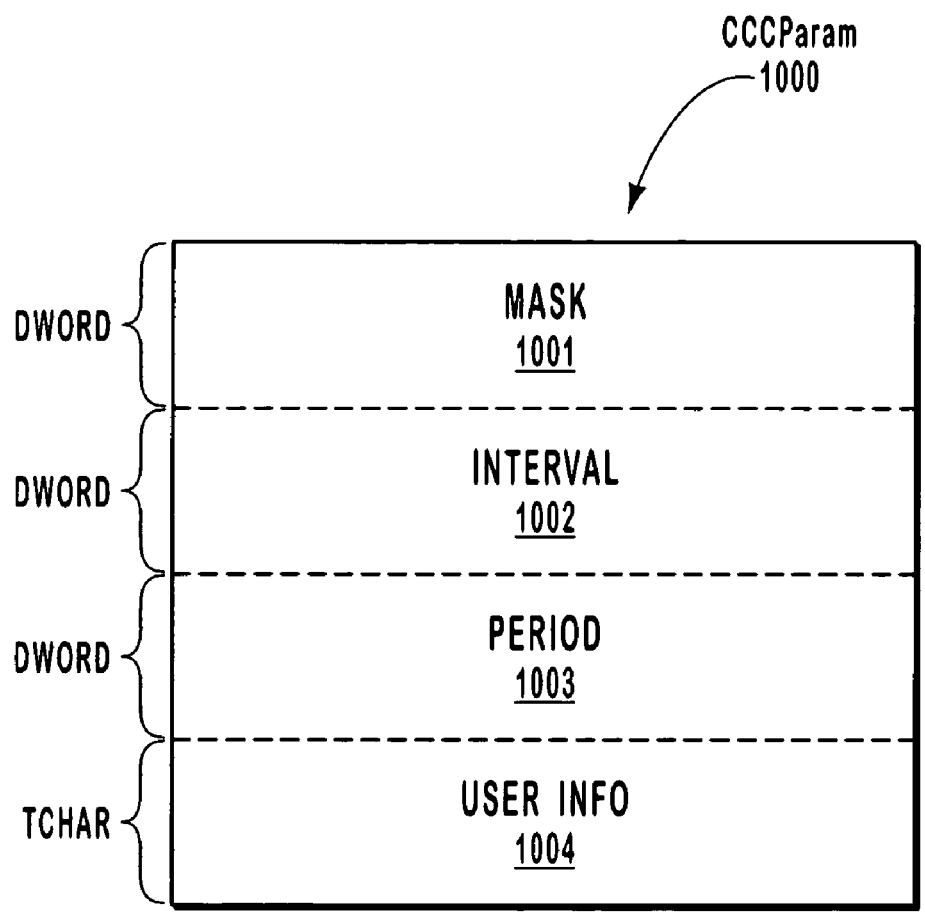
FIG. 10 illustrates a data structure that may be used to pass relevant information in a call control command.

FIG. 9 illustrates a series of APIs that function calls may follow to implement the principles of the present invention. FIG. 10 illustrates a data structure 1000 called CCCParam, which represents various parameters related to a call control command. For example, the CCCParam data structure may include a field 1002 that usually describes an interval of time for an action, a field 1003 that usually describes a period of time that represents the life span of the action from the time the action starts, and a field 1004 that usually represents user information such as a telephone number. The data structure 1000 also includes a field 1001 that represents a mask indicating which of the fields 1002, 1003, and 1004 are valid.

For example, the data structure 1000 may be defined in C++ as follows:

```
{
DWORD dwmask;        //mask to tell API which of the following data
                     //members are valid:
                     //INTERVAL_VAL(0x01) = dwInterval is
                     valid
                     //PERIOD_VAL(0x02) = dwPeriod is valid
                     //USRDATA_VAL(0x04) = szUsrData is valid
DWORD dwInterval;    //action interval
DWORD dwPeriod;      //action life span period from the time an action
                     //starts
TCHAR szUsrData[32]; //user information such as telephone number
}
```

Referring back to FIG. 9, the uppermost API 900A represents an API structure that function calls may follow to request to stay connected for a period of time. The API 900A is listed as BOOL CCCStayConnected(HCALL hcall, CCCParam&cccParam). The "hcall" parameter is the handle returned by the TAPI module upon connection with the call control server 201. The &cccParam parameter represents an instance of the type CCCParam described above with reference to FIG. 10. When using this API 900A, only the dwInterval member of the CCCParam data structure is used. The dwInterval member is used to specify the amount of time, in seconds, that the call control server 201 should remain connected before hanging up.

The second API 900B represents a structure that functions calls may follow to request that the call control server call back to a specified telephone number. For this API, all of the members of the CCCParam must be valid (i.e., the mask field 1001 should be set to 0x07). Here, the szUsrData member includes the telephone number that the call control server should call back to. The call control server 201 will call back to that number every "dwInterval" seconds for a period of "dwPeriod".

The third API 900C represents a request for the call control server to echo data supplied from the telephonic device 600 back to the telephonic device 600. In this case, szUsrData contains the data that the tester wishes to echo. dwPeriod is the number of times the call control server 201 should echo the data (not the minutes the echo shall last). If the tester wishes different data to be echoed, the same API is used but with a similar function call that has the different echo data specified in the szUsrData member. Note that echoing data is performed with data lines. To accomplish the echo feature, the telephonic device uses a TAPI module to establish a data connection with the call control server and, in response, receives the handle over the data line.

The API 900D may be used to request that data be downloaded from the call control server 201. The parameter szFileName is used to specify the name of the file to be downloaded.

The API 900E adds a client telephonic device to the call control server's telephone list. Both the dwPeriod and szUsrData members of the data structure cccParam must be valid. The dwPeriod member tells the call control server how long it should keep the telephone device's information. The szUsrData member indicates the telephonic device's telephone number. The ActionInterest is a data type that allows for enumeration of various desired actions. The actMask variable may be used to discern actions or interest from actions of no interest using a binary mask.

These APIs 900A through 900E illustrates examples of how function calls may be made to another application program through a TAPI module. The receiving application program may convert these function calls into less intuitive forms recognized by the call control server 201 before transmitting the call control command to the call control server.

Instead of having to draft a program that includes these types of function calls, a user may instead type in a simply command that results in execution of a program that makes the function calls. For example, a user may type in the following call control command in a command line:

CCSMakeConf ccsLine1 ccsLine2.

This command is translated into an instruction to the call control server to establish a conference call between the client and two call control server lines.

Also the command "CCSCallBack myNumber" may be used to instruct the call control server 201 to call the specified number.

These various APIs and command are expressed in language that is relatively intuitive to a human programmer or user. However, the APIs and commands may not be recognized by the call control server 201. Accordingly, the receiving application translates these commands into a potentially less intuitive form that is recognized by the call control server.

For example, as mentioned above, a user may enter a sequence of DTMF tones representative of the keypad characters 0 through 9, star "*", and number "#". These DTMF sequences may be recognized by the call control server even though the DTMF sequences are not necessarily intuitive. For example, the less intuitive DTMF commands may include "001 *" which means to hang up immediately, "002*X*" which means to stay connected for X seconds, "003#X#Y#A*" which means to call me back at the number X every Y seconds for Z minutes, or "004#X#Y*" which means to put my address X on the call control server's telephone list for Y minutes during which the call control server 201 may do something to the telephone number according to my interest Y (e.g., conference, voice call, data call, or the like). These commands are not intuitive in that they do not resemble anything descriptive in any human language.

The user may also enter non-DTMF data call control commands such as "echo#X#Y*" which means to echo data X back for Y times, or perhaps "download#X*" which means to download file X to me.

By allowing for translation of more intuitive commands into the command forms recognized by the call control server, there is increased flexibility on how a user may issue a call control command. In addition, there are additional, more intuitive ways for a user to issue the call control commands. Thus, the user may have an easier time working with the call control commands. In addition, as mentioned above, the user may issue commands over a data line as well, instead of being limited to issuing commands using a sequence of just 12 DTMF tones. Accordingly, the principles of the present invention provide for systems, methods and computer program products for allowing for more flexible and intuitive testing of a telephonic device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer program product comprising one or more computer-readable media having computer-executable instructions for implementing a method for allowing call control using data commands provided over a data line in a telephone network that includes a telephonic device that is network connectable to a call control server, the call control server configured to recognize and respond to commands issued by the telephonic device to thereby accomplish telephonic tasks, the method comprising:

a specific act of receiving a call control command from a data line;

a step for processing so as to fulfill the call control command on one or more voice lines or one or more data lines, said processing step comprising identifying acts of higher and lesser priority;

storing higher priority acts in a first location for more immediate execution; and storing lower priority acts in a second location for less immediate execution.

2. A computer program product as recited in claim 1, wherein the step for processing so as to fulfill the call control command comprises:

a specific act of interpreting the call control command;

a specific act of determining one or more acts that would need to be accomplished to comply with the call control command; and a specific act of implementing the one or more acts on one or more voice lines.

3. A computer program product as recited in claim 1, wherein the method further comprises:

a specific act of executing the one or more higher priority acts; and a specific act of executing the acts in the second location only after the higher priority acts have been executed.

4. A computer program product as recited in claim 1, wherein the call control command is a first call control command, wherein the one or more acts are a first set of one or more acts, and wherein the method further comprises:

a specific act of receiving a second call control command from a voice line;

a specific act of interpreting the second call control command;

a specific act of determining a group of one or more new acts that would need to be accomplished to comply with the second call control command; and a specific act of implementing the group of one or more new acts.

5. A computer program product as recited in claim 1, wherein the specific act of receiving the call control command from a data line comprises the following:

receiving the call control command from the data line via a Telephony Application Program Interface.

6. A computer program product as recited in claim 1, wherein the first location is a queue.

7. A computer program product as recited in claim 1, wherein the second location is a database.

* * * * *